United States Patent
Lee et al.

(10) Patent No.: US 9,584,650 B2
(45) Date of Patent: Feb. 28, 2017

(54) INTER-DEVICE COMMUNICATION SYSTEM, APPARATUS AND CONTROL METHOD THEREFOR

(71) Applicant: LG ELECTRONICS INC., Seoul (KR)

(72) Inventors: Minhun Lee, Seoul (KR); Sungha Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/761,245

(22) PCT Filed: Oct. 24, 2014

(86) PCT No.: PCT/KR2014/010053
§ 371 (c)(1),
(2) Date: Jul. 15, 2015

(87) PCT Pub. No.: WO2015/064965
PCT Pub. Date: May 7, 2015

(65) Prior Publication Data
US 2015/0365513 A1    Dec. 17, 2015

Related U.S. Application Data

(60) Provisional application No. 61/896,667, filed on Oct. 29, 2013.

(51) Int. Cl.
*H04M 3/00*       (2006.01)
*H04M 1/725*     (2006.01)
(Continued)

(52) U.S. Cl.
CPC ..... *H04M 1/72569* (2013.01); *H04M 1/6091* (2013.01); *H04M 1/72577* (2013.01);
(Continued)

(58) Field of Classification Search
CPC ........... H04M 1/72569; H04M 1/6091; H04M 1/72577; H04M 2250/02; H04M 1/7253;
(Continued)

(56) References Cited

U.S. PATENT DOCUMENTS 8,781,457 B2 * 7/2014 Randazzo ............. H04W 48/04
                                                              455/418
2012/0242474 A1    9/2012 Oh et al.

FOREIGN PATENT DOCUMENTS

KR    2000-0045243 A    7/2000
KR    10-0559986 B1    3/2006
(Continued)

*Primary Examiner* — Dhaval Patel
(74) *Attorney, Agent, or Firm* — Birch, Stewart, Kolasch & Birch, LLP (57) ABSTRACT

The present invention relates to an inter-device communication system, an apparatus and a control method therefor that determines compliance with driver distraction regulations and that provides restricted services to a device. More particularly, the present invention relates to an inter-device communication system comprising: a server device for providing one or more services to client devices; and a plurality of client devices for receiving the one or more services from the server device, for storing driver distraction support information indicating whether services comply with the driver distraction regulations, and for restrictedly outputting the received one or more services based on the stored driver distraction support information.

19 Claims, 6 Drawing Sheets

(51) Int. Cl.
*H04M 1/60* (2006.01)
*H04W 4/04* (2009.01)
*H04W 76/02* (2009.01)
*H04W 84/12* (2009.01)
*H04L 29/08* (2006.01)

(52) U.S. Cl.
CPC ......... *H04W 4/046* (2013.01); *H04W 76/023* (2013.01); *H04L 67/16* (2013.01); *H04M 1/7253* (2013.01); *H04M 2250/02* (2013.01); *H04M 2250/06* (2013.01); *H04M 2250/64* (2013.01); *H04W 84/12* (2013.01)

(58) Field of Classification Search
CPC ......... H04M 2250/06; H04M 2250/64; H04W 76/023; H04W 4/046; H04W 84/12; H04L 67/16
USPC .... 455/411, 418, 456.4, 41.2, 420; 340/441, 340/989
See application file for complete search history.

(56) References Cited

FOREIGN PATENT DOCUMENTS

| KR | 10-0827135 B1 | 5/2008 |
| KR | 10-2011-0040280 A | 4/2011 |
| WO | WO 2012/133982 A1 | 10/2012 |

* cited by examiner

INTER-DEVICE COMMUNICATION SYSTEM, APPARATUS AND CONTROL METHOD THEREFOR

CROSS REFERENCE TO RELATED APPLICATIONS

This application is the National Phase of PCT International Application No. PCT/KR2014/010053, filed on Oct. 24, 2014, which claims priority under 35 U.S.C. 119(e) to U.S. Provisional Application No. 61/896,667, filed on Oct. 29, 2013, all of which are hereby expressly incorporated by reference into the present application.

TECHNICAL FIELD

The present invention relates to an inter-device communication system, and more particularly, to an inter-device communication system for providing a service distinguished on the basis of profile information (attribute information) of a device.

BACKGROUND ART

Inter-device communications may include Wi-Fi Direct, Bluetooth and Zigbee.

Basically, in case of using the inter-device communication, one-to-one connection between two devices is possible. For instance, a smartphone-to-smartphone connection, a mouse-to-laptop connection, and a PC-to-printer (personal computer-to-printer) connection are possible. Hence, various contents such as photos, music, videos and the like can be eventually exchanged using the inter-device communication.

Moreover, the inter-device communication is available for one-to-many connection as well as for one-to-one connection. For instance, in case of using the inter-device communications, a mouse, a keyboard, a printer and the like can be simultaneously connected to a single computer.

For the driver's convenience, a vehicle is equipped with additional equipment such as a car audio, a navigator and the like. And, the additional equipment are generally attached to a dashboard provided in front of a driver seat. The equipment such as the car audio, the navigator and the like are generally called a head unit (H/U).

Recently, as vehicle equipment tend to electronically operate and mobile terminals such as a mobile phone, a smartphone and the like are used in general, many ongoing efforts are made to research and develop an interworking service between the head unit and the mobile terminal. And, the interworking service is based on the inter-device communication. Through this, the head unit can provide an application or service provided by the mobile terminal in a manner of extending the application or service into a function of the head unit. For instance, a navigation app or service screen in the mobile terminal is identically displayed on a display device of the head unit and a manipulation of the mobile terminal can be performed within a head unit device.

Thus, the demands for an inter-device communication system, apparatus and controlling method thereof are increasingly rising within legal limits regulated to enable a driver to focus on driving.

SUMMARY OF THE INVENTION

Accordingly, the present invention is directed to an inter-device communication, apparatus and controlling method thereof that substantially obviate one or more problems due to limitations and disadvantages of the related art. The technical task of the present invention is to provide an inter-device communication, apparatus and controlling method thereof, by which limited services can be provided in a manner of considering whether driver distraction regulation is applied to a corresponding device.

Technical tasks obtainable from the present invention are non-limited by the above-mentioned technical task. And, other unmentioned technical tasks can be clearly understood from the following description by those having ordinary skill in the technical field to which the present invention pertains.

In one technical aspect of the present invention, provided herein is an inter-device communication system, including a server device configured to provide at least one service to a client device and a plurality of client devices configured to be provided with the at least one service by the server device, a plurality of the client devices configured to store driver distraction support information indicating whether to be regulated by a driver distraction regulation, a plurality of the client devices configured to output the provided at least one service by restricting the provided at least one service based on the stored driver distraction support information.

In another technical aspect of the present invention, provided herein is an inter-device communication system, including at least one client device configured to output a service provided by a server device and a server device configured to establish a session with the at least one client device, the server device configured to detect a location of each of the session established at least one client device, the server device configured to determine whether each of the at least one client device is a device for a driver, the server device configured to provide a restricted service to the client device determined as the device for the driver.

In further technical aspect of the present invention, provided herein is a method of controlling an inter-device communication system, including the steps of transmitting driver distraction support information indicating whether a client device is regulated by a driver distraction regulation to a server device from a client device and providing a distinguished service to the client device from the server device based on the received usage information.

Accordingly, effects of an inter-device communication, apparatus and controlling method thereof according to the present invention are described as follows.

According to at least one of embodiments of the present invention, different services can be provided in a manner of distinguishing a device to which driver distraction regulation should be applied from a device to which driver distraction regulation may not be applied.

An additional scope of applicability of the present invention shall become obvious from the detailed description in the following. It is to be understood that both the foregoing general description and the following detailed description of the preferred embodiments of the present invention are exemplary and explanatory and are intended to provide further explanation of the invention as claimed.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Singular expression may include plural expressions unless having a clear meaning in the context.

In the present application, such a terminology as 'include', 'have' and the like intends to designate that a feature, a number, a step, an operation, a component, a part or a combination thereof disclosed in the specification exists and should be understood as not excluding possibility of existence or addition of at least one or more features, numbers, steps, operations, components, parts or combinations thereof.

The present invention relates to an apparatus for supporting an inter-device communication, an inter-device communication system and controlling method thereof. Such a communication technology as Wi-Fi Direct, Bluetooth, or Zigbee may be applied to the inter-device communication, by which the present invention is non-limited.

Basically, in case of using the inter-device communication, one-to-one connection between two devices is possible. For instance, a smartphone-to-smartphone connection, a mouse-to-laptop connection, and a PC-to-printer (personal computer-to-printer) connection are possible. Hence, various contents such as photos, music, videos and the like can be eventually exchanged using the inter-device communication.

Moreover, the inter-device communication is available for one-to-many connection as well as for one-to-one connection. For instance, in case of using the inter-device communications, a mouse, a keyboard, a printer and the like can be simultaneously connected to a single computer.

For the driver's convenience, a vehicle is equipped with additional equipment such as a car audio, a navigator and the like. And, the additional equipment are generally attached to a dashboard provided in front of a driver seat. The equipment such as the car audio, the navigator and the like are generally called a head unit (H/U).

Recently, as vehicle equipment tend to electronically operate and mobile terminals such as a mobile phone, a smartphone and the like are used in general, many ongoing efforts are made to research and develop an interworking service between the head unit and the mobile terminal. And, the interworking service is based on the inter-device communication. Through this, the head unit can provide an application or service provided by the mobile terminal in a manner of extending the application or service into a function of the head unit. For instance, a navigation app or service screen in the mobile terminal is identically displayed on a display device of the head unit and a manipulation of the mobile terminal can be performed within a head unit device.

Figure 1:
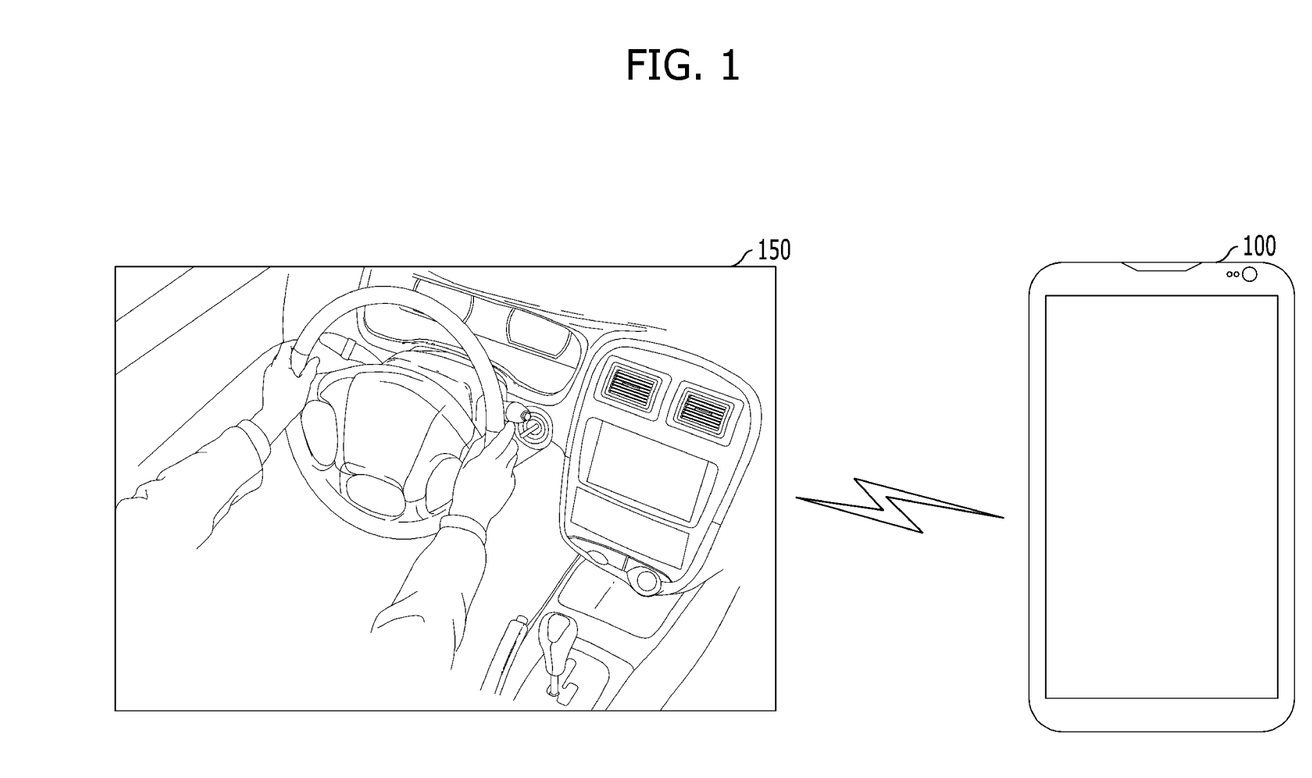
FIG. 1 is a diagram for a basic configuration of establishing one-to-one connection through an inter-device communication system.

FIG. 1 is a diagram for a basic configuration of establishing one-to-one connection through an inter-device communication system.

Referring to FIG. 1, a single mobile terminal 100 and a single head unit 150 are establishing a session (hereinafter named a connection) for transceiving data using an inter-device communication. If data are transceived between devices by this method, the mobile terminal 100 and the head unit 150 can share a navigation screen, a TV output screen, a playback of music, a social network service, a vehicle information screen and the like with each other. In the following description, a configuration of a device capable of supporting the inter-device communication system is described in detail with reference to FIG. 2.

Thus, as various services are provided using the head unit 150 of the vehicle, the driver's convenience may be enhanced. Yet, when a prescribed service is used, it may cause a problem that a driver may have difficulty in focusing on driving. Hence, in order to restrict prescribed services provided to a driver while driving a vehicle, a driver distraction regulation is applied.

In this case, the driver distraction regulation means the regulation to enable a driver to focus on driving a vehicle in a manner of restricting services other than the requirements for the vehicle driving while the vehicle is in motion. For instance, while a vehicle is in motion, such services as a TV output service, an image/video play service, a text message transceiving service and the like cannot be provided through the head unit except such services as a navigation service, a music play service and the like. Therefore, in order to provide services through a head unit of a vehicle using an inter-device communication, it is necessary to consider the described driver distraction regulation.

Although the single mobile terminal 100 and the single head unit 150 may be connected to each other, as shown in FIG. 1, a single device 200 and a plurality of devices 200 may be connected to each other or a plurality of devices 200 and a plurality of devices 200 may be connected to each other. In particular, the single mobile terminal 100 can be connected to a rear unit for a front or rear passenger seat user as well as to the head unit 150. Yet, in case that the driver distraction regulation is applied to the rear unit, it may cause a problem that a necessary service is not available due to an unnecessary regulation.

Therefore, instead of a method of determining whether to apply the driving regulations depending on a vehicle running state by an existing inter-device communication technology, one embodiment of the present invention mentioned in the following description proposes a technology capable of providing service functions and contents of a mobile terminal 100 in a manner of distinguishing the service functions and the contents depending on a primary user of a vehicle client device.

Figure 2:
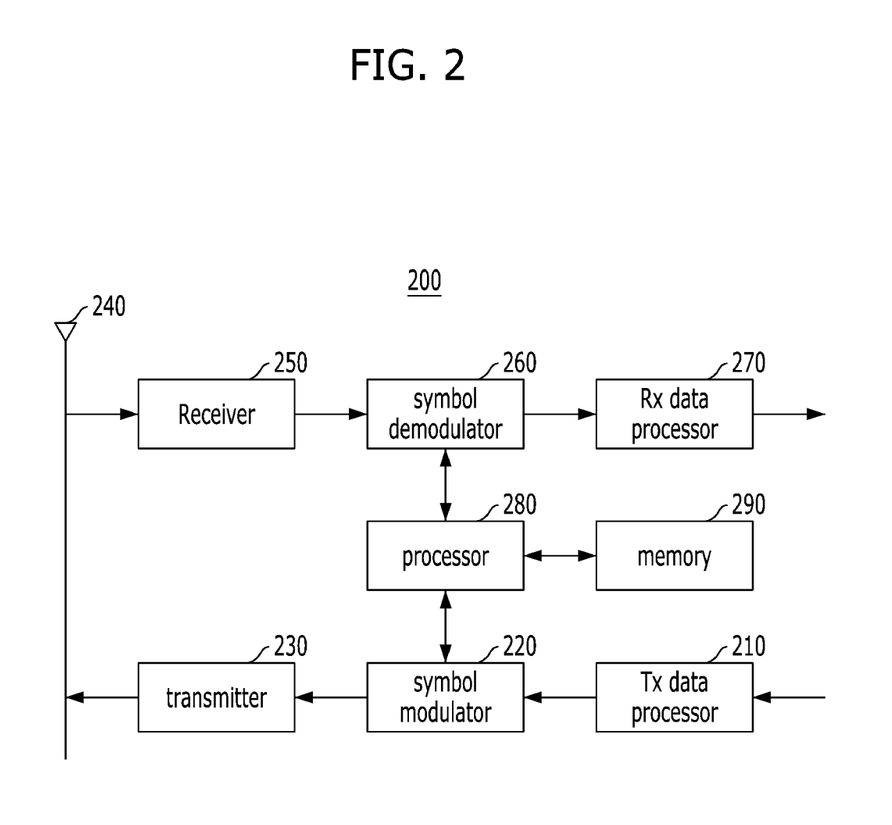
FIG. 2 is a block diagram of a device capable of performing an inter-device communication according to one embodiment of the present invention.

FIG. 2 is a block diagram of a device capable of performing an inter-device communication according to one embodiment of the present invention. The block diagram shown in FIG. 2 is provided for a case that an inter-device communication is wireless. In case of a communication by wire, more or less components may be omitted or added. Each of the aforementioned mobile terminal 100 and the aforementioned head unit 150 may include at least one of the components of the device 200 shown in FIG. 2.

Referring to FIG. 2, a device 200 configured to support an inter-device communication may include a transmit data processor 210, a symbol modulator 220, a transmitter 230, a transmit-receive antenna 240, a receiver 250, a symbol demodulator 260, a receive data processor 270, a processor 280, and a memory 290.

According to the drawing shown in FIG. 2, although a single transmit-receive antenna 240 is shown, it is obvious that at least two antennas can be provided. Therefore, the device shown in FIG. 2 may support an MIMO (multiple input multiple output) system. And, MU-MIMO (multi user-MIMO) may be supportable as well as SU-MIMO (single user-MIMO).

The transmit data processor 210 receives data and then performs formatting and coding on the received data. Subsequently, the transmit data processor 210 provides modulated symbols (data symbols) generated from interleaving and modulating the coded data to the symbol modulator 220. The symbol modulator 220 generates a stream of symbols using the received data symbols and pilot symbols.

The symbol modulator 220 multiplexes the received data and pilot symbols together and then transmits the multiplexed data and pilot symbols to the transmitter 230. In doing so, each of the transmitted symbols may include the data symbol, the pilot symbol, or a null signal value. The pilot symbols may include FDM (frequency division multiplexing) symbols, OFDM (orthogonal frequency division multiplexing) symbols, TDM (time division multiplexing) symbols, or CDM (code division multiplexing) symbols.

If the transmitter 230 receives the symbol stream, the transmitter 230 can convert the received symbol stream to at least one or more analog signals. Additionally, the transmitter 230 can perform amplification, filtering, frequency converting, and the like to enable the converted analog signal to fit a determined radio channel. The transmit-receive antenna 240 may transmit the converted/adjusted analog signal to another device.

Meanwhile, the transmit-receive antenna 240 can deliver a signal received from another device to the receiver 250. The receiver 250 adjusts the received signal (e.g., filtering, amplification, frequency converting, etc.) and then samples the adjust signal. The symbol demodulator 260 demodulates a pilot signal from the received signal and then delivers it to the processor 280 to be used for channel estimation.

If a frequency response estimated value is received by the processor 280, the symbol demodulator 260 performs data demodulation to obtain symbol estimated values for the received signal. The symbol demodulator 260 then provides the symbol estimated values to the receive data processor 270. The receive data processor 270 reconstructs the transmitted traffic data by performing demodulation, deinterleaving and decoding on the received signal using the symbol estimated values.

The processing by the symbol demodulator 260 and the processing by the receive data processor 270 may correspond to the processing by the symbol modulator 220 and the processing by the transmit data processor 210, respectively.

The processor 280 controls overall operations of the device 200. The processor 280 may be connected to the memory 290 configured to store program codes and/or data. The memory 290 is connected to the processor 280 to store operating systems, applications and related data.

The processor 280 may be called one of a controller, a microcontroller, a microprocessor, a microcomputer and the like. And, the processor 155/180 may be implemented using hardware, firmware, software and/or any combinations thereof. A processor implemented by hardware according to one embodiment of the present invention may be provided with one of ASICs (application specific integrated circuits), DSPs (digital signal processors), DSPDs (digital signal processing devices), PLDs (programmable logic devices), FPGAs (field programmable gate arrays), and the like.

According to one embodiment of the present invention, a processor implemented by firmware or software may be able to perform functions of the present invention with a module or a procedure. And, the firmware or software may be provided to the processor 280 in a manner of being saved in the memory 290.

In addition to the configuration shown in FIG. 2, it is obvious that other additional configurations can be further added. For instance, if the device 200 includes a mobile terminal such as a smartphone, the device 200 may include an audio input device such as a microphone, a video input device such as a camera, a user input unit such as a button, a keypad, a touch sensor and the like, a sensing unit configured to detect states (e.g., location, orientation, acceleration, deceleration, speed, etc.) of the device 200, and an output unit such as a display, a speaker and a haptic module. Moreover, a memory card slot, a power supply unit connected to an external power source or an internal power source to supply a power required for the device 200 and the like can be further provided to the device 200 shown in FIG. 2.

In the following description, a device applied to an inter-device communication system according to one embodiment of the present invention may include at least one of the components included in FIG. 2.

As mentioned in the foregoing description with reference to FIG. 1, the mobile terminal 100 and the head unit 150 can share a navigation screen, a TV output screen, a playback of music, a social network service, a vehicle information screen and the like with each other using an inter-device communication. As a representative technology for sharing services between devices, a technology such as CarPlay, Mirrorlink or the like exists. The Mirrorlink technology is used as one example to describe one embodiment of the present invention, by which the present invention is non-limited. And, one embodiment of the present invention can be applied to various technologies.

Figure 3:
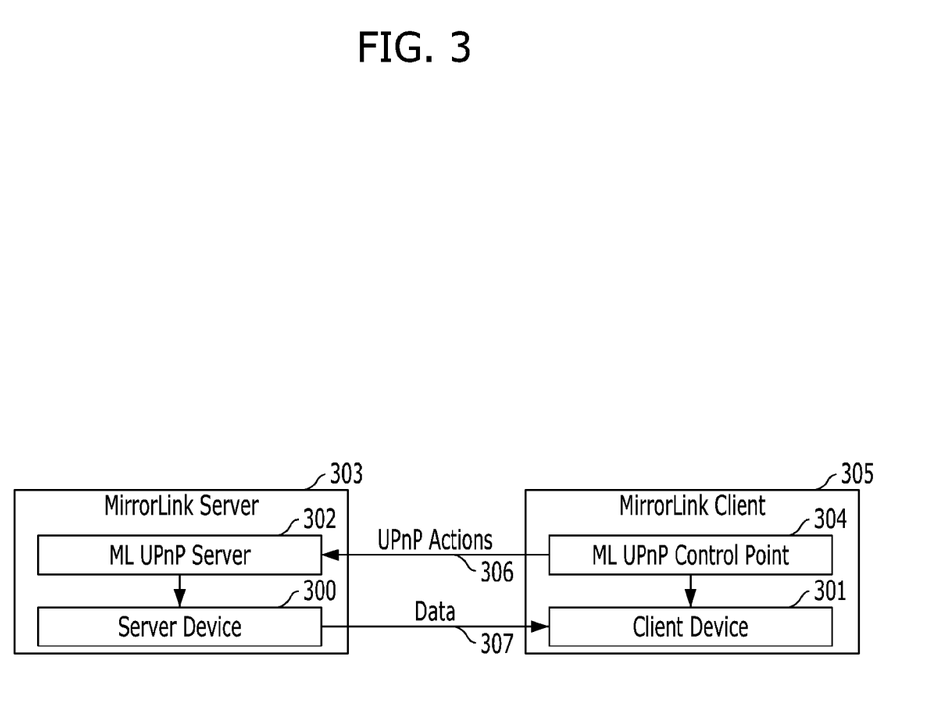
FIG. 3 is a diagram to describe a data transmitting system between devices supportive of Mirrorlink as one example for implementing one embodiment of the present invention.

FIG. 3 is a diagram to describe a data transmitting system between devices supportive of Mirrorlink as one example for implementing one embodiment of the present invention.

Based on 'UPnP Device Architecture' of UPnP (Universal Plug and Play)Forum, Mirrorlink technology designs a server device 300 (called a source device or a server equipment, hereinafter named a server device), a client device 301 (called a sink device, a sink equipment, or a client equipment, hereinafter named a client device).

If the client device 301 receives a command from a user, the client device 301 forwards the received command to the server device 300. And, the server device 300 can provide the client device 301 with a service based on the forwarded command. In doing so, in establishing a connection between the client device 301 and the server device 300 for data transmission and reception or forwarding or delivering commands between the client device 301 and the server device 300, the transmission and reception are performed through an ML (Mirrorlink) UPnP control point (hereinafter named a control point) 304 and an ML (Mirrorlink) UPnP server (hereinafter named a mirrorlink server) 302.

In general, a mobile terminal such as a smartphone having relatively high operation capability and relatively large storage space may play a role as the server device 300 and a head unit having relatively low operation capability and relatively small storage space may play a role as the client device 301, and vice versa.

In particular, the control point 304 included in the client device 301 can store various UPnP services. In case of making a request 306 for prescribed data to the mirrorlink server 302 using the UPnP service saved in the control point, the server device 300 can deliver the requested prescribed data to the client device 301 based on the request delivered from the mirrorlink server 302.

For instance, in case that a user inputs an output command of a TV screen through the client device 301, the control point 304 searches the saved UPnP services for a UPnP action corresponding to a service for outputting the TV screen and is then able to deliver the found UPnP action to the mirrorlink server 302. Having received the UPnP action, the mirrorlink server 302 delivers a command corresponding to the UPnP action to the server 300, thereby controlling the server device 300 to transmit the TV screen.

In order to transceive data using the Mirrorlink technology described with reference to FIG. 3, it is necessary to establish a connection between devices by wire/wireless in the first place. A control method for establishing the connection is described in detail with reference to FIG. 4 as follows.

Figure 4:
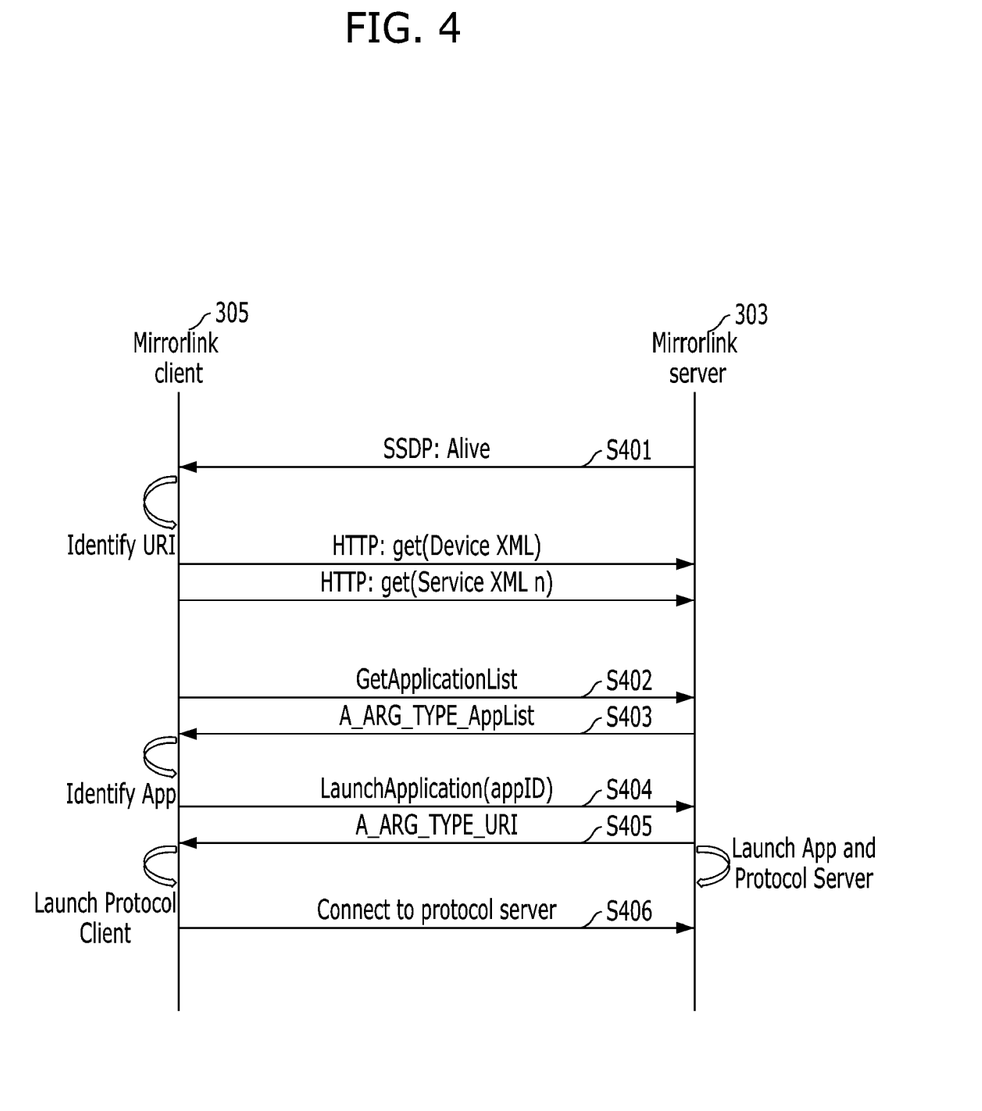
FIG. 4 is a diagram of a data transceiving process for establishing an inter-device session using a Mirrorlink technology according to one embodiment of the present invention.

FIG. 4 is a diagram of a data transceiving process for establishing an inter-device session using a Mirrorlink technology according to one embodiment of the present invention.

Referring to FIG. 4, a mirrorlink server 303 and a mirrorlink client 305 discover each other after a device advertisement [S401, SSDP:Alive]. Subsequently, if the mirrorlink client 305 makes a request for a list of available applications to the mirrorlink server 303 [S402], the mirrorlink server 303 can send back the application list to the mirrorlink client 305 in response to the request in the step S402. In doing so, a list of services providable by the mirrorlink server 303 can be guided through XML (extensible mark-up language) or the like [S403].

Having received the available application list, the mirrorlink client 305 is able to request a launch service by sending a request for launching the application selected by a user [S404]. Having received the request, the mirrorlink server 303 transmits information related to the requested application to the mirrorlink client 305 [S405]. The mirrorlink client 305 is then able to establish a connection to the mirrorlink server 303 based on the received information [S406].

Meanwhile, in performing an inter-device communication using Mirrorlink technology, there is a service for delivering profile information (e.g., device information, information for contents transmission, configuration information, capability information, etc.) or property information of the client device 301 to the server device 300. In the Mirrorlink technology, such a service is called a client profile service. For detailed example, the profile information may include an identification information for identifying a device, a device name information, a manufacturing information, a model name information, or the like. Particularly, an information for contents transmission may include one of a connection information, an information on RTP (real-time transport protocol), an information on a payload type, an information on a version of a protocol, and the like.

According to one embodiment of the present invention, it is proposed that information indicating whether it is a head unit or a rear unit is included in the profile information of the client device. In this case, the head unit is a device to which the driver distraction regulation is applied and the rear unit is a device to which the driver distraction regulation is not applied. So to speak, the information indicating whether it is the driver distraction regulation applied device or the driver distraction regulation non-applied device is proposed to be included in the profile information of the corresponding client device. A control method of establishing a session using the included profile information is described in detail with reference to FIG. 5 as follows.

Figure 5:
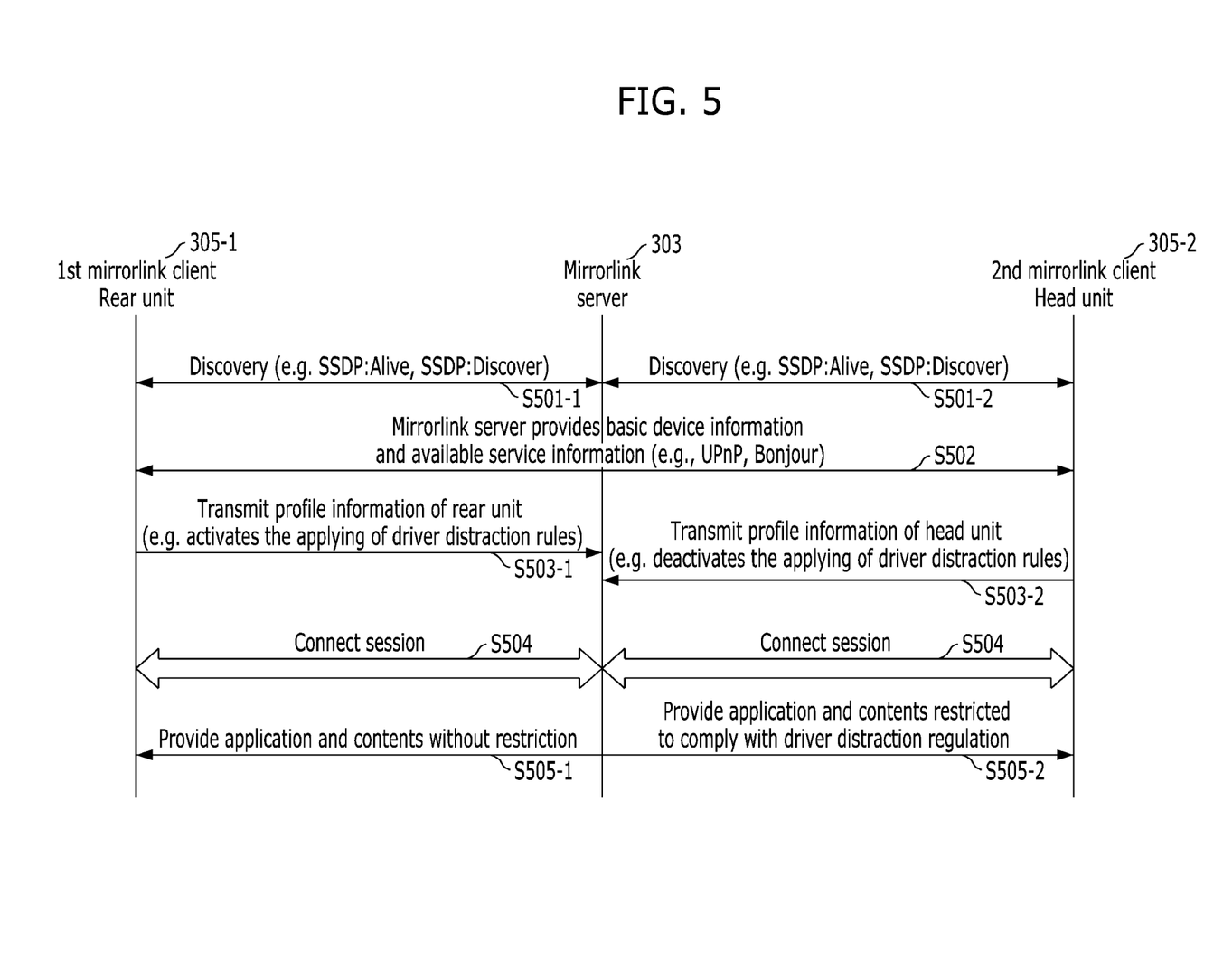
FIG. 5 is a diagram for a control method of delivering whether a driver distraction regulation is applied using a profile information transmitted in case of session establishment according to one embodiment of the present invention.

FIG. 5 is a diagram for a control method of delivering whether a driver distraction regulation is applied using a profile information transmitted in case of session establishment according to one embodiment of the present invention.

Referring to FIG. 5, assume a situation that two mirrorlink clients are connected to a single mirrorlink server 303. Particularly, assume that the two mirrorlink clients include a $1^{st}$ mirrorlink client 305-1 corresponding to a rear unit and a $2^{nd}$ mirrorlink client 305-2 corresponding to a head unit.

In a step S501-1 and a step S501-2, the $1^{st}$ mirrorlink client 305-1, the $2^{nd}$ mirrorlink client 305-2 and the mirrorlink server 303 discover each other. Subsequently, the mirrorlink server 303 provides basic device information and available service information to the mirrorlink clients. In this case, the service information may include an information indicating whether UPnP is supported, an information indicating whether Bonjour technology is supported, and the like.

In a step S503-1 and a step S504-1, the $1^{st}$ mirrorlink client 305-1 and the $2^{nd}$ mirror client 305-2 deliver their profile informations to the mirrorlink server 303. In particular, the profile information may include a driver distraction support information indicating whether it is a device to which the driver distraction regulation is applied.

In a step S502-1, the $1^{st}$ mirrorlink client 305-1 can transmit a profile information, which includes an information indicating that the $1^{st}$ mirrorlink client 305-1 is a rear unit and is not regulated by the driver distraction regulation, to the mirrorlink server 303. In a step S502-2, the $2^{nd}$ mirrorlink client 305-2 can transmit a profile information, which includes an information indicating that the $2^{nd}$ mirrorlink client 305-2 is a head unit and is not regulated by the driver distraction regulation, to the mirrorlink server 303.

Thereafter, if a session is connected [S504], the mirrorlink server 303 can provide a restricted service based on the profile information in providing services to the mirrorlink clients. To the $1^{st}$ mirrorlink client 305-1 not regulated by the driver distraction regulation, applications and contents can be provided without restrictions [S505-1]. To the $2^{nd}$ mirrorlink client 305-2 not regulated by the driver distraction regulation, applications and contents restricted to comply with the driver distraction regulation can be provided [S505-2].

According to one embodiment of the present invention, it is proposed to utilize an item "A_ARG_TYPE_ClientProfile" predefined in the mirrorlink protocol for the profile information. A new field 'DriverDistractionSupport element' is additionally defined to have a driver distraction support information included and is then included in the item "A_ARG_TYPE_ClientProfile". And, the newly defined field is delivered using a client profile service.

Table 1 shows one example of a new field included in the item "A_ARG_TYPE_ClientProfile".

list and contents to the rear unit irrespective of the driving regulation. The server device can provide the rear unit with unrestricted services.

Meanwhile, according to the above description, the profile information is delivered to the server device using the client profile service among the UPnP services, by which the present invention is non-limited. According to another embodiment of the present invention, the profile information can be delivered to the server device 300 using HTTP (hypertext transfer protocol).

According to one embodiment of the present invention, a value of the field "driverDistractionSupport" may be set by each mirrorlink client user. For instance, if the mirrorlink client selects whether a corresponding device corresponds to

TABLE 1

| Element | Description | Parent | Availability |
|---|---|---|---|
| clientProfile | Profile Information about a MirrorLink Client | — | Required |
| clientID | ID of the MirrorLink Client (A_ARG_TYPE_String) | clientProfile | Required |
| friendlyName | Short user-friendly description of client | clientProfile | Required |
| manufacturer | Manufacturer Name (A_ARG_TYPE_String) | clientProfile | Required |
| modelName | Model Name (A_ARG_TYPE_String) | clientProfile | Required |
| modelNumber | Model Number (A_ARG_TYPE_String) | clientProfile | Required |
| iconPreference | Desired properties for icons delivered from the MirrorLink Server Device | clientProfile | Required |
| driverDistractionSupport | Support to apply Driver Distraction guideline (A_ARG_TYPE_Bool) Default: "True" | clientProfile | Required |

Regarding the items included in Table 1, as mentioned in the foregoing description, a field "driverDistractionSupport" is added to the last represented item by including the device informations (e.g., clientID, friendlyName, manufacturer, etc.).

For instance, the file "driverDistractionSupport" has Boolena property and is set to a default value 'True'. If it is 'True', it is able to indicate a rear unit by setting a head unit to 'False'.

Such an operation is summarized as Table 2.

a head unit or a rear unit, the value of the field "driverDistractionSupport" can be set depending on the selection.

According to another embodiment of the present invention, a value of the field "driverDistractionSupport" may include a value set up by a manufacturer. In particular, when a device is manufactured, a usage of the device is determined. In case of a device used as a head unit, the corresponding device can be released in a manner of setting the field "driverDistractionSupport" to 'true' in manufacturing the corresponding device. On the other hand, In case of a

TABLE 2

| | Driving regulation applied - Head unit | Driving regulation no applied - Rear unit |
|---|---|---|
| Element Value Example of A_ARG_TYPE - ClientProfile | DriverDistractionSupport == true<br><clientProfile><br>  <clientID>C1_1</clientID><br>  <friendlyName>HeadUnit</friendlyName><br>  <driverDistractionSupport>true</driverDistractionSupport><br></clientProfile> | DriverDistractionSupport == false<br><clientProfile><br>  <clientID>C1_2</clientID><br>  <friendlyName>RearSeat</friendlyName><br>  <driverDistractionSupport>false</driverDistractionSupport><br></clientProfile> |
| Operation of server device | Deliver AppList authenticated to comply with a driving regulation guide only | Deliver all contents and AppList Full mirroring mode supported |

In particular, looking into a left column corresponding to a head unit in Table 2, a field "driverDistractionSupport" has a value 'true'. Hence, the server device 300 delivers a list of applications authenticated to comply with the driving regulation to the head unit only. In particular, the server device 300 can provide the head unit with restricted services only.

Looking into a right column corresponding to a rear unit in Table 2, a field "driverDistractionSupport" has a value 'false'. Hence, the server device 300 delivers all application device used as a rear unit, the corresponding device can be released in a manner of setting the field "driverDistractionSupport" to 'false' in manufacturing the corresponding device.

Meanwhile, according to the embodiment mentioned in the foregoing description, based on the profile information of the mirrorlink client 305, the mirrorlink server 302 directly restricts services provided to the mirrorlink client 305 (i.e., by restricting an available application list), by which the present invention is non-limited. For instance, the mirrorlink client 305 may be able to directly restrict the corresponding device using the profile information of its own. In particular, the mirrorlink server 302 provides all application lists and all contents irrespective of the head unit or the rear unit. Yet, the mirrorlink client 305 directly put restrictions of services to comply with the driver distraction regulation.

According to one embodiment of the present invention, a driving state of a head unit loaded vehicle is detected. And, it is proposed to put a service restriction in response to the driving state. For instance, while a vehicle is stopped, it is unnecessary to apply the regulation to a head unit.

The example of applying the regulation in accordance with the driving state is described as follows. First of all, it may be able to apply the driver distraction regulation using a combination of at least one of the following cases: (1) a case that a driving speed of a vehicle is equal to or higher than a prescribed speed; (2) a case that a transmission state information of a vehicle indicates a drive state (D mode) or a reverse state (R mode); and (3) a case that a battery level of a vehicle is equal to or lower than a prescribed value.

Meanwhile, according to the embodiment mentioned in the foregoing description, using the profile information received from the mirrorlink client 305, it is proposed to determine whether it is a head unit or a rear unit. Besides, a control method including the steps of determining a location of the head unit or the rear unit in a vehicle and applying the driver distraction regulation based on the determined location information is described as follows.

Figure 6:
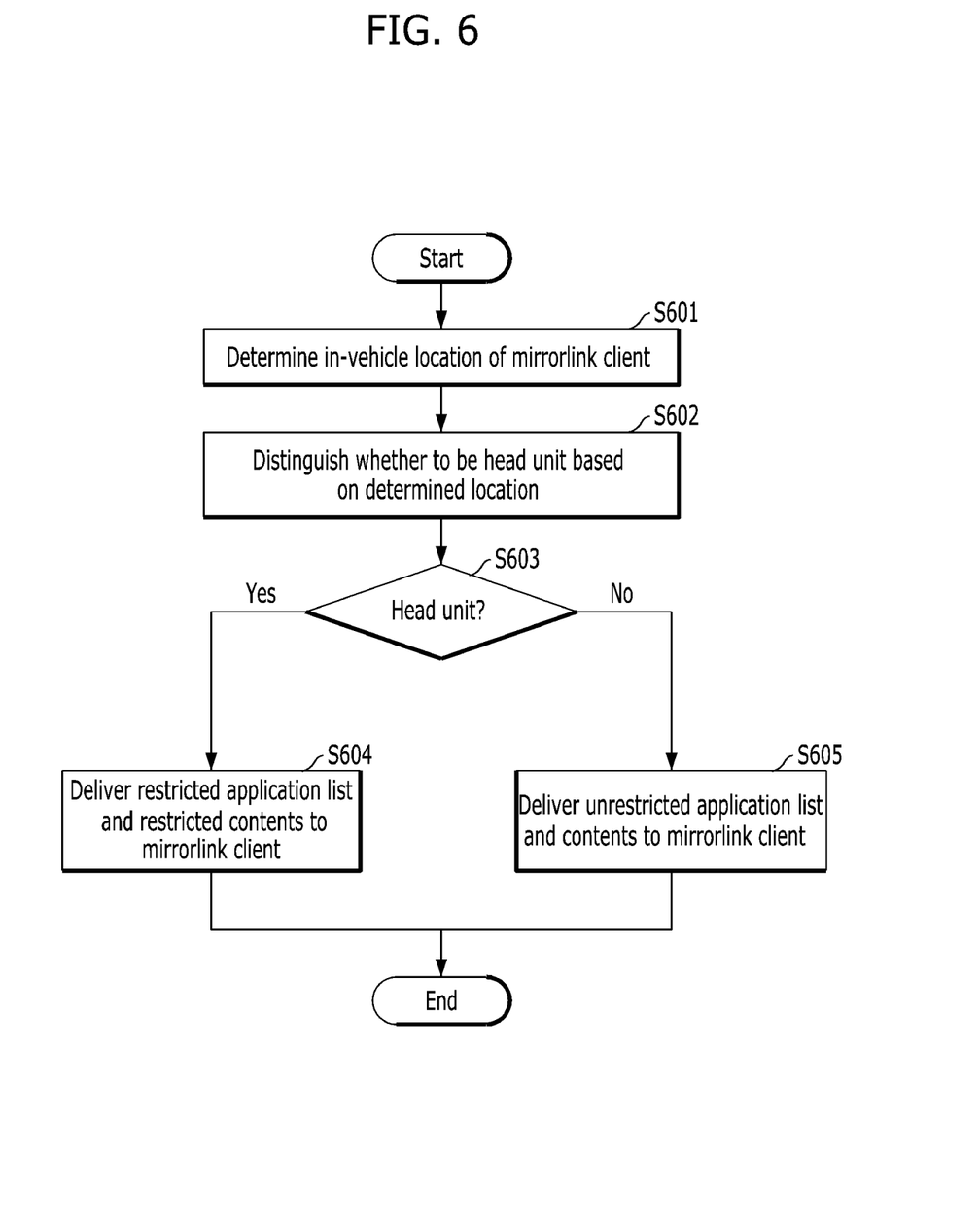
FIG. 6 is a flowchart of a control method of determining a location of a head unit or a rear unit in a vehicle and then applying a driver distraction regulation based on the determined location information according to one embodiment of the present invention.

FIG. 6 is a flowchart of a control method of determining a location of a head unit or a rear unit in a vehicle and then applying a driver distraction regulation based on the determined location information according to one embodiment of the present invention.

In a step S601, the mirrorlink server determines a location of the mirrorlink client 305 in a vehicle. The in-vehicle location may include a 3-dimensional location but is the information for distinguishing whether it is a device (e.g., a head unit) located at a driver seat. Hence, it is enough for the in-vehicle location to be a 2-dimensional location that excludes a dimension corresponding to a height in the vehicle. If a device is located at the driver seat, it should be regulated by the driver distraction regulation.

Moreover, it is possibly to use a precise location like coordinates information with reference to a specific point in a vehicle. Yet, as mentioned in the foregoing description, a rough location information for distinguishing whether a device is located at a driver seat may be enough to use.

Hence, in a step S602, the mirrorlink server 303 determines whether the mirrorlink client 305 is a head unit or not based on the location of the mirrorlink client 305 determined in the step S601. In a step S603, based on a result of the determination made in the step S602, if the mirrorlink client 305 is the head unit, the routine goes to a step S604. If not, the routine may go to a step S605.

In the step S604, the mirrorlink server 303 delivers a restricted application list and restricted contents to the mirrorlink client 305 to comply with the driver distraction regulation.

In the step S605, the mirrorlink server 303 may be able to deliver an unrestricted application list and unrestricted contents to the mirrorlink client 305 irrespective of the driver distraction regulation.

What is claimed is:

1. An inter-device communication system for sharing services within a vehicle, the inter-device communication system comprising:
 a server device configured to:
 share at least one service wirelessly with at least one client device, and
 determine whether the at least one client device is a head unit or not based on the location of the at least one client device,
 wherein the at least one client device is located in the vehicle, and
 wherein the at least one client device is further configured to:
 set driver distraction support information indicating whether a driver of the vehicle is to be regulated by a driver distraction regulation,
 restrict the output of the received at least one service based on the set driver distraction support information if the at least one client device is the head unit, and
 provide the output of the received at least one service if the at least one client device is not the head unit.

2. The inter-device communication system of claim 1, wherein the driver distraction support information is included in device identification information on the at least one client device.

3. The inter-device communication system of claim 1, wherein the at least one client restricts a portion of the received at least one service output on the at least one client device based on the stored driver distraction support information.

4. The inter-device communication system of claim 3, wherein if a moving speed information of the vehicle is equal to or higher than a prescribed speed, the at least one client device is further configured to restrict the portion of the received at least one service output on the at least one client device, and
 wherein if the moving speed information of the vehicle is less than the prescribed speed, the at least one client device is further configured to output all portions of the received at least one service on the at least one client device.

5. The inter-device communication system of claim 3, wherein if a transmission state information of the vehicle indicates a drive state or a reverse state, the at least one client device is further configured to restrict the portion of the received at least one service output on the at least one client device, and
 wherein if the transmission state information of the vehicle indicates a stopped driving state, the at least one client device is further configured to output all portions of the received at least one service on the at least one client device.

6. The inter-device communication system of claim 3, wherein if a battery level information of the vehicle is equal to or lower than a prescribed numerical value, the at least one client device is further configured to restrict the portion of the received at least one service output on the at least one client device.

7. The inter-device communication system of claim 1, wherein the at least one client device includes a first client device and a second client device,
 wherein the server device is a mobile device that is located in the vehicle,
 wherein the first client device is configured to transmit a service restriction request to the server device, and
 wherein the server device is further configured to provide a restricted service to the second client device based on the service restriction request transmitted by the first client device.

8. The inter-device communication system of claim 7, wherein the first client device is further configured to transmit a control signal to the second client device for controlling the second client device through the server device, and wherein the second client device is further configured to launch a corresponding function based on the control signal.

9. An inter-device communication system for a vehicle, the inter-device communication system comprising:

at least one client device configured to output a service provided by a server device; and the server device configured to:

establish a session with the at least one client device, detect a location in the vehicle of the at least one client device that the session is established, determine whether the at least one client device is a head unit or not based on the location of the at least one client device, provide a restricted service to the at least one client device if the at least one client device is the head unit, and provide an unrestricted service to the at least one client device if the at least one client device is not the head unit.

10. The inter-device communication system of claim 9, wherein the at least one client device includes a first client device and a second client device, wherein the first client device is further configured to transmit a service restriction request to the server device, and wherein the server device is further configured to provide a restricted service to the second client device based on the service restriction request.

11. The inter-device communication system of claim 10, wherein the first client device is further configured to transmit a control signal to the second client device for controlling the second client device through the server device, and wherein the second client device is further configured to launch a corresponding function based on the control signal.

12. A method of controlling an inter-device communication system, the method comprising:

sharing at least one service between a server device and at least one client device;

determining whether the at least one client device is a head unit or not based on the location of the at least one client device;

setting, by the at least one client device, driver distraction support information in the at least one client device indicating whether a driver of the vehicle is to be regulated by a driver distraction regulation;

restricting, by the at least one client device, the output of the received at least one service on the at least one client device based on the stored driver distraction support information when the at least one client device is the head unit; and providing, by the at least one client device, the output of the received at least one service when the at least one client device is not the head unit.

13. The method of claim 12, wherein the driver distraction support information is included in device identification information on the at least one client device.

14. The method of claim 12, further comprising:

restricting a portion of the received at least one service output on the at least one client device based on the stored driver distraction support information.

15. The method of claim 14, further comprising:

if a moving speed information of the vehicle is equal to or higher than a prescribed speed, restricting the portion of the received at least one service output on the at least one client device; and if the moving speed information of the vehicle is less than the prescribed speed, outputting all portions of the received at least one service on the at least one client device.

16. The method of claim 14, further comprising:

if a transmission state information of the vehicle indicates a drive state or a reverse state, restricting the portion of the received at least one service output on the at least one client device; and if the transmission state information of the vehicle indicates a stopped driving state, outputting all portions of the received at least one service on the at least one client device.

17. The method of claim 14, further comprising:

if a battery level information of the vehicle is equal to or lower than a prescribed numerical value, restricting the portion of the received at least one service output on the at least one client device.

18. The method of claim 12, wherein the at least one client device includes a first client device and a second client device, wherein the first client device transmits a service restriction request to the server device, and wherein the server device provides a restricted service to the second client device based on the service restriction request transmitted by the first client device.

19. The method of claim 18, wherein the first client device transmits a control signal to the second client device for controlling the second client device through the server device, and wherein the second client device launches a corresponding function based on the control signal.

\* \* \* \* \*